United States Patent [19]

Swank

[11] 4,012,637
[45] Mar. 15, 1977

[54] RADIOGRAPHIC SCREEN WITH IMPROVED RESOLUTION

[75] Inventor: Robert K. Swank, Schenectady, N.Y.

[73] Assignee: General Electric Company, Schenectady, N.Y.

[22] Filed: May 5, 1975

[21] Appl. No.: 574,238

[52] U.S. Cl. .............................. 250/475; 250/483
[51] Int. Cl.² ...................................... G03B 41/16
[58] Field of Search ........................... 250/475, 483

[56] References Cited

UNITED STATES PATENTS 3,499,150  3/1970  Tajima et al. ...................... 250/475
3,912,933  10/1975  VanStappen ...................... 250/475

Primary Examiner—Archie R. Borchelt
Attorney, Agent, or Firm—Geoffrey H. Krauss; Joseph T. Cohen; Jerome C. Squillaro

[57] ABSTRACT

A conventional x-ray screen-film system includes a phosphor intensifying screen "sandwich", including a backing layer facing the x-rays, the phosphor layer itself, and a so-called "overlayer" adjacent the photographic film. X-rays passing through the backing cause scintillations within the phosphor, emitting light photons which, in turn, pass through the overlayer, a small air gap (caused by lack of perfect optical contact of the overlayer and the adjacent surface of the film) and into the film so as to form a latent image on the photographic film. The present change involves making the overlayer partially light absorbing so that those light photons which, for example, have been totally internally reflected at the overlayer to air gap surface, returned into the phosphor and then scattered out again through the overlayer, will be absorbed to a much larger extent than those light photons which travel more or less directly from their point of origin through the overlayer into the film, since the indirectly transmitted photons will travel through the overlayer at least three half-trips (at least two of which will be at a substantial angle and therefore through a relatively long path). This selective absorption of the long-path light photons substantially increases the resolution of the screen-film system without adversely affecting the signal-to-noise ratio (in particular, the quantum mottle).

4 Claims, 1 Drawing Figure

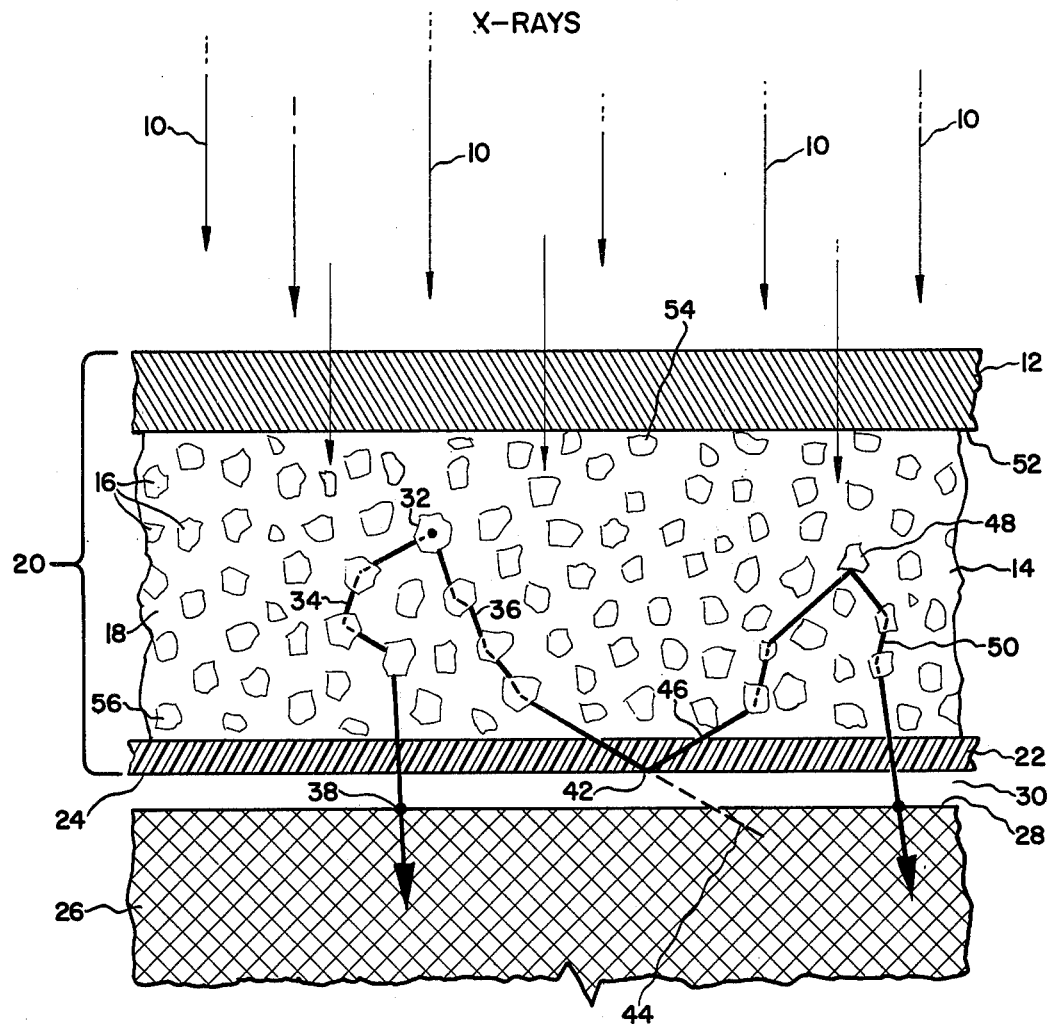

RADIOGRAPHIC SCREEN WITH IMPROVED RESOLUTION

This invention relates to an x-ray intensifying screen-film combination, and in particular, to such a combination having improved resolution.

As is well understood in the x-ray art, the now conventional technique of making photographic records of x-ray images utilizes a holder or cassette which includes both an x-ray intensifying screen and a photographic (negative) film which is to be exposed. The intensifying screen itself typically comprises three layers, namely, as positioned in the order that the x-rays would encounter them, a backing layer, the phosphor layer itself, and a quite thin transparent overlayer. The photographic film is placed, nominally in contact, with this last mentioned layer which has a relatively smooth surface so as to make the contact with the adjacent surface of the film; nevertheless, even when the screen is pressed against the film, the lack of perfect fit causes much of the area of nominal contact to, in fact, include a thin but nevertheless real spacing or air gap (on the order of 1 micron in thickness). In operation, the x-rays which have traversed the object being photographed reach the backing layer (which typically is opaque to visible radiation but quite transparent to x-rays) so as to enter the phosphor layer. This phosphor layer is typically a suspension of relatively small crystals or grains (e.g., of a very few microns average diameter) of an x-ray phosphor composition in a transparent suitable binder, such as a synthetic resin. Each x-ray photon which encounters and is absorbed by a phosphor particle will be re-emitted as a large plurality (e.g., several hundred) photons of much lower frequency (i.e., greater wavelength) and, in particular, of such wavelength as to be visible light photons (at least in the main). A large portion of these generated light photons will at least initially propagate in the general direction toward the photographic film, of which a substantial portion will pass through the remaining part of the phosphor layer and the overlayer of the screen without substantial deviation. However, at least a substantial portion of such light photons, although originally directed toward the film, will encounter other phosphor particles in such a manner as to be substantially deviated in direction (by any one of refraction, reflection and/or scattering) so as to enter and pass through the overlayer at a substantial incident angle relative to the normal thereto. In addition, some of the photons will be initially emitted in directions making a substantial angle relative to the normal to the surface of the overlayer. Both such classes of photons may reach the opposite surface of the overlayer (i.e., that surface which is adjacent to the photographic film but typically spaced therefrom by an air gap) at an angle greater than the critical angle of the overlayer (plastic) to air interface. Such photons (sometimes more conveniently referred to as "rays") will be totally internally reflected at the overlayer to air surface so as to traverse the thin overlayer and re-enter the phosphor layer. At least a certain proportion of such reflected rays will again return to the overlayer because of the combined (or individual) effects of reflection and scattering by the phosphor particles (aided to some extent by refractive effects as the rays pass from binder material to phosphor particles and vice versa). Some of these returned rays may be incident on the overlayer to air surface at angles substantially less (as measured from the normal) than the critical angle so as to then reach the photographic film after passing through the air gap; on the other hand, some of these returned rays may once again reach the overlayer to air interface at relatively large angles (relative to the normal) and be reflected back into the overlayer and phosphor layer, which doubly reflected rays may ultimately repeat the process of being returned to and through the overlayer and air gap to the photographic film; indeed, in theory, the reflection and return process may continue substantially indefinitely. For any such rays that are reflected even once by the overlayer to air surface and which ultimately reach the photographic film, the rays will, in general, be substantially removed in the lateral direction (i.e., in a direction parallel to the surfaces of the various layers) from their original point of origin. Such rays formed from x-ray photon absorption at a point well removed in a lateral sense from the point at which the corresponding light photon strikes the film will obviously adversely affect the resolution (and contrast) of the photographic image formed.

A primary object of the present invention is to improve the resolution of the photographic image formed by an intensifying screen-film combination.

A more specific object is to improve the resolution of such a system without adversely affecting other characteristics of the system, especially the radiographic mottle and, in particular, the contribution thereto of quantum mottle.

A more detailed object is to attentuate to a substantial extent those light rays which have traveled a substantial lateral distance within the intensifying screen before they reach the photographic film, relative to the intensity of those rays which reach the film more directly without having traveled a large distance in this same lateral sense.

A still more specific object of the invention is to selectively attenuate the rays as mentioned immediately above without either increasing the undesirable quantam mottle or otherwise adversely affecting any of the factors which might reduce the signal-to-noise ratio of the final photographic image.

Other objects, advantages and features of the invention will appear or be obvious from the following detailed description of the invention taken in conjunction with the accompanying drawing in which:

The sole FIGURE is a somewhat idealized, greatly enlarged cross section through a small part of a x-ray intensifying screen and film according to the invention.

The conventional parts of the x-ray intensifying screen and film combination (which may typically be contained in a cassette, not shown,) will first be described. X-rays, schematically illustrated by arrows 10 which have passed through the object (which may, for example, be a part of the human body) of which a radiographic film record is to be made pass through the backing layer 12 of the x-ray intensifying screen 20 and enter the relatively thick phosphor layer 14. The phosphor layer 14, which comprises the active part of screen 20, typically consists of an extremely large number of relatively closely spaced phosphor particles 16 supported in a suitable transparent binder 18, such as an artificial resin (plastic). The other surface of phosphor layer 14 is coated with a relatively thin, normally transparent so-called overlayer 22, which serves to both protect the phosphor layer from abrasion and provide a relatively smooth surface at 24. The photographic film 26 is positioned directly against this surface 24 so as to make at least fairly good mechanical contact, but in practice because of the lack of perfect matching of surfaces that are only relatively smooth (i.e., are not for example, optically polished) there exists between the adjacent surface 28 of film 26 and surface 24, an air gap 30. Since the drawing is not to scale, it is mentioned that the thickness of the phosphor layer may be approximately 100 microns, that of the overlayer only about 8 microns and a typical average width of the air gap may be only 1 micron. Despite the relative thinness of this air gap, it nevertheless does form with surface 24 of the overlayer (which is typically an artificial resin) a higher refractive index to a lower refractive index optical interface (as seen from the direction of the light photons traveling from the phosphor layer 14 toward the film 26)

Let it be assumed that an x-ray photon has been absorbed by phosphor particle 32, and that two light photons (among several hundred others not pictured) have been generated therefrom which follow the paths indicated at 34 and 36, respectively. As shown for path 34, this particular light photon is only minimally refracted, reflected and/or scattered by the various other particles in the phosphor layer 14 and both enters and emerges from the overlayer 24 along a line nearly normal to the surface (e.g., 24) thereof so as to enter the upper surface 28 of film 26 also substantially along the normal and will therefore ultimately reach the emulsion layer and form a latent image at a point thereon which is substantially directly aligned with its original point of origin (i.e., particle 32). In other words, if one defines laterally as any direction that is parallel to the surfaces of the various layers (e.g., surfaces 24 and 28), the photon following path 34 and ultimately entering the film at point 38 will ultimately be recorded on the photographic film at a point which is not substantially removed in this lateral sense from its point of origin, so that it will accurately represent the radiographic information carried by the x-ray photon which caused its generation (and in particular the relative position of this x-ray photon as it met the screen-film combination initially). On the other hand, that light photon which follows path 36 will reach surface 24 of overlayer 22 at a point 42 which is substantially removed in a lateral sense from its point of origin. If the angle of incidence of this ray at point 42 (as measured from the normal to surface 24) is less than the critical angle (measured in the same manner), then the ray will (at least in part) continue along the dotted line path 44 and will obviously be recorded on the emulsion of the film at a point substantially removed in a lateral sense from its original point of origin at particle 32. Obviously, this will lessen the theoretically possible resolution of the final image in that this photon "should" be recorded at a different point (as previously explained for the photon following path 34,38). Even if the ray at point 42 strikes the surface at less than the critical angle, a substantial proportion of intensity will be reflected along the path 46. Furthermore, if the angle at point 42 is greater than the critical angle, all of the ray will be reflected along this path 46. In either event, a substantial amount of the energy will follow path 46 which, merely for purposes of illustration, is assumed to strike a particular particle 48 in such a manner as to be reflected to path 50 so as to pass through overlayer 22 and air gap 30 and enter surface 28 of the film 26 in a direction making only a small angle with the normal. Thus, the light photon which follows path 36, 46, 50 will in this particular case be recorded on the film as if it were a photon originating from phosphor particle 48 (rather than from 32), thereby obviously degrading the resolution of the photographic image. Stated in other terms, if part of the light emitted by phosphor particle 32 when it absorbs an x-ray photon appears along undesirable path 50 as well as desirable path 38, the photographic image will be at least somewhat "blurred"; or, in other words, the resolution of the image will be reduced.

Obviously, the particular paths shown in the FIGURE are merely exemplary and different possible paths involving, for example, multiple passes through the overlayer and multiple reflections at the overlayer to air gap surface 24 are possible, such multiple path typically involving multiple reflections from different particles (in a manner analogous to the reflection at particle 48). Further, even when the light ray is incident on the overlayer to air surface 24 at an angle less than the critical angle, a proportion of its energy will, in general, nevertheless be reflected. As is well understood by the laws of reflection in optics, the closer the incident angle approaches the critical angle, the greater will be the intensity of the reflected proportion of the light (and obviously the lesser will be such proportion, that is transmitted), so that for all relatively large incident angles, a substantial portion of the light radiation will be returned to the phosphor layer and of this radiation at least an appreciable proportion will ultimately find its way out of surface 24 through the air gap and into the film 26 at positions which, in general, are substantially removed in the lateral sense from the position of a light photon traveling more or less directly from its point of origin, (e.g., 32) directly toward the film (e.g., at least in the vicinity of ray path 38).

From the above, it may be seen that the resolution of the final photographic image may be improved if those light photons that follow paths such as at 36, 46, 50 are either eliminated or at least substantially attenuated relative to those light photons which travel more or less directly toward the film as, for example, along paths 34, 38. The instant invention proposes to accomplish such relative attenuation of the undesirable photons (or more particularly those photons which travel undesirable paths) relative to the desirable photons. As will be explained more specifically hereinafter, the technique utilized is to make the overlayer (which is normally transparent) partially absorbing as to the light photons emitted by the phosphor layer. It should be noted that in a conventional phosphor screen-photographic film system in which the overlayer is substantially transparent, approximately one-half of the light photons emitted by the phosphor follow paths exemplified at 34, 38, namely, more or less directly from their point of origin to the film; while approximately one-half of the photons reaching the film have traveled paths that are either analogous to the ones shown at 36, 46 and 50 or of the type described above involving any one of partial reflection, substantial directional deviation by the various phosphor particles, and/or reflection from such phosphor particles. Although one may first assume that making the overlayer 22 somewhat absorbing (as by incorporating therein a suitable dye at a suitable proportion to reach a desirable optical density) might merely reduce the intensity of both the desirable as well as the undesirable rays by the same attenuating factor, a little thought will shown that this is not, in fact, true. For example, assume that the overlayer 22 is made to have such absorbing qualities that a ray passing perpendicularly (relative to its surfaces) therethrough will be attenuated by a factor such as to have an intensity of 0.6 (i.e., if the original intensity is unity the emerging intensity at surface 24 will be 0.6), the desirable rays will be transmitted at 60% of their initial intensity. However, for the exemplary ray path 36, 46, 50 the light will be attenuated by a much larger factor. If, for example, the light ray were actually reflected at surface 24 while traveling along the normal and thus passed through overlayer 22 twice before emerging along path 46, and then passed through the layer 22 a third time along the path 50 (also substantially along the normal), then the light ray emerging along path 50 from surface 24 would be attenuated three times by a factor of 0.6 so as to be attenuated by a factor of $(0.6)^3$ or a factor of about 0.22. Thus, even under such conditions (which is not in fact really representative of what happens as may be seen from the drawing) the undesirable rays would be attenuated to only slightly greater than one-third the intensity of the emerging desirable rays (i.e., 0.22/0.6 is only slightly greater than one-third). In fact, what would occur for the ray following paths 36, 46, 50 is that it would be attenuated by substantially more than this factor of 0.22 since in its first two passages through overlayer 22 (i.e., along path 36 and path 46) it is attenuated more than if it passed through the overlayer twice along the normal to its surface. Since the actual incident angle of the ray reaching a point 42 and the (necessarily identical) angle of the ray after reflection along path 46 are merely exemplary, there is no particular advantage in calculating the exact optical path and the exact absorption for such path relative to a given incident angle. However, it may be readily shown that for typical angles, the optical path length through overlayer 22 in both directions is roughly equivalent to three half-trips through such overlayer 22 in a direction normal to its surface. Thus, for a photon following path 36, 46, 50, the attenuating factor will be approximately $(0.6)^3$ times 0.6 (for the combined paths 36 and 46 for the first expression and for the single path 50 for the second term) or $(0.6)^4$ which is approximately 0.13. Thus, the light following the paths 36, 46, 50 is somewhat less (having an intensity of 0.13) than one-quarter of the light photon which follows path 34, 38 (having an intensity of 0.6). Thus, if it is assumed that 50% of the light photons travel along paths analogous to that of 34, 38 and 50% of the photons follow paths analogous to that shown at 36, 46, 50, then the intensity of the first type of rays will be about 30%, while the intensity of the second undesirable types of rays will be about 6.5% (expressed as a percentage of the original 100% of light photons generated). The total amount of radiation reaching the film will therefore be approximately 36.5% of that originally generated. If one now normalizes the total amount of radiation actually reaching the film at 100 units, just over 82 of these units will be attributable to light that has traveled along paths such as at 34, 38, and only just under 18 of these units will be attributable to light which has traveled along paths such as the exemplary one at 36, 46, 50. Thus, on the assumption that originally one-half of the light traveled directly to the film and one-half through the undesirable paths indicated, nevertheless, of the light reaching the film through a partially absorbing overlayer (specifically one having an absorption of 0.4 so as to allow 6/10 of the light to pass through perpendicularly) substantially less than 20% will be of the undesirable type.

Approached from a different point of view, it should be noted that although the overall intensity of the light has been diminished to only 0.37 of the light emitted (it will be subsequently shown that such general loss of intensity is not important with modern phosphor materials), this represents a loss of only 40% (from 50% to 30% of the total original radiation) of the desired light, while it represents an elimination of 87% (from 50% to 6.5%) of the undesired radiation which would cause degradation of the resolution (and contrast) of the final photographic image. It should be noted that if the optical density of the overlayer 22 is increased (so as to allow less than 0.6 of the perpendicularly passing radiation to emerge), then the discrimination against the undesirable resolution-reducing photons may be even greater than that of the example just given; on the other hand, such increase in the absorbing effects of overlayer 22 will, of course, also attenuate the desired radiation which may or may not be tolerable depending on the "speed" of the phosphor screen and photographic film combination required. It should be noted, however, that the discrimination will increase rapidly as the overlayer is made more and more absorbent, since the discrimination is proportional to a power (namely a cube in the example given) of the transmission factor, which is always less than 1.

It may be thought that the sacrifice in speed of the intensifying screen (therefore of the screen-film combination) is a practical disadvantage, and that one is merely trading off lower speed for improved resolution. Actually, this is not true, at least for the more modern phosphor screens, in which the quantum mottle is the limiting factor rather than the speed of the screen. There are three important characteristics of a x-ray intensifying screen film system: the resolution, the radiographic mottle, and the speed (the list is not necessarily in order of importance). Although all three of these traits are interdependent, they will be first treated separately. As stated above, the primary purpose of the instant improvement is to increase the resolution of the system by greatly attenuating those light photons which follow undesirable paths from their point of origin in the phosphor layer to (relatively remote positions of) the film. Although there are other factors which affect the resolution of the system, since the improvement described herein does not affect them, these are not described in detail.

The second characteristic, namely radiographic mottle can be defined as the unevenness of optical density of the developed photographic film from each small area to its adjacent area in the absence of any real difference in opaqueness of the actual object; in other words, radiographic mottle is the background "noise" seen on the final film. It, in turn, is made up of what may be termed optical noise contributed by at least three major sources, which will be designated as the screen structural mottle, the film grain mottle and quantum mottle. The first of these obviously has to do with the size, randomness, and packing factor of the individual phosphor particles in the phosphor layer of the intensifying screen, none of which are affected by the present invention. The film grain mottle is obviously caused by analogous considerations as to the light sensitive particles in the film emulsion, which, again, are unchanged by the present invention. By far, the most important of the three at the present state of the art is the quantum mottle, since in any well designed phosphor screen-film system, it is the quantum mottle which limits the "signal-to-noise" in the final image. Quantum mottle is not caused by any structural irregularity, but rather is an inherent characteristic of modern screen-film systems (which are quite efficient or "fast"). Specifically, quantum mottle is caused by the fact that as less and less x-ray photons are needed in order to form a sufficiently "bright" final image (because of the speed of modern systems), the random statistical variations in the number of x-ray photons (expressed, for example, as a percent of the average member) varies more and more. A full explanation of quantum mottle may be found, for example, in the Cleare et al article in the *American Journal of Roentgenology and Radium Therapy*, Vol. 88, No. 1 (July 1962), pages 168–164. As explained in this article, quantum mottle is caused by the fact that the actual number of x-ray photons absorbed in a small area (for example each square millimeter) of the phosphor screen is, in general, different than the average number absorbed per unit area (i.e., the total number absorbed by the screen divided by the area of the screen in, say, square millimeters). More particularly, the fluctuation in the number of photons absorbed by each particular unit area, expressed as a percent of the average number of photons absorbed by a unit area increases as the number of photons becomes smaller and smaller. Specifically, this relative (or proportional percentage) fluctuation will vary as the reciprocal of the square root of the average number of photons absorbed per unit area. Thus, for example, if the average number of x-ray photons absorbed per unit area (say, per square millimeter) is 10,000, the relative fluctuation is 1/100 or 1 percent; but if on an average only 100 are absorbed, the proportional fluctuation is 1/10 or a 10 percent fluctuation. Statistical theory shows that on an average 68 percent of the unit areas will absorb between 100−10 (i.e., 90) and 100+10 (i.e., 110) photons and 32 percent will absorb either less than 90 or more than 110 photons under the assumed circumstances, although in theory all such areas are nominally the same. Stated in other terms, these purely random or statistical variations (not representing any actual characteristic of a desired image) will cause over 30 percent of the areas to be either more than 10 percent "too bright" or "too dark". This then is the underlying cause of quantum mottle, resulting in a random or background noise in the image, completely unrelated to either the object being studied or any structure of the apparatus (including the phosphor screen and film).

Since the amount of quantum mottle decreases as the total number of x-ray photons absorbed per unit area increases, quantum mottle can be reduced by increasing the average number of x-ray photons striking each unit area of the phosphor screen; however, this means that the object (e.g., a human patient) is exposed to a larger "dose" of x-rays, and therefore is obviously highly disadvantageous at least in the medical field. Alternatively, one can attempt to increase the efficiency of the phosphor screen as to the proportion of x-ray photons reaching the screen that are absorbed thereby; indeed, progress has been made in finding such phosphor materials which have higher absorbing efficiencies and such materials do exhibit improved (i.e., lower) quantum mottle for the same intensity of x-ray radiation falling thereon. Thus, for example, rare earth oxyhalide (e.g., LaOBr:Tb) phosphor screens are about twice as absorbing as old $CaWO_4$ screens. This means that either for the same amount of radiation passing through the patient, the newer screens can produce images with substantially less quantum mottle, or, alternatively, with only one-half as much x-ray intensity reaching the newer screens, the final image will exhibit the same quantum mottle as the older screens. In addition to this increase in absorption efficiency, these newer phosphor materials exhibit an increase (on the order of three times) in the number of light photons which are emitted for each x-ray photon absorbed. Thus, for the same intensity of x-rays, twice as many are absorbed and each of the absorbed x-ray photons produces three times as many light photons, so that the newest screens are 2 × 3 or six times as "fast" as old screens were. Unfortunately, however, the second factor of three (which may be termed the "conversion" or fluorescent efficiency) does not assist in any way in improving the quantum mottle, which is determined solely by the number of x-ray photons absorbed. Thus, in practice, one cannot utilize the three fold increase in speed obtained by this increased conversion efficiency, since if the original x-ray radiation is reduced to one-sixth, although the final image will have the same intensity, it will exhibit substantially more quantum mottle. Thus, as a practical matter, assuming that the quantum mottle is a limiting factor, the two-fold increase in absorption efficiency yields an improved "signal-to-noise ratio" (for the same original x-ray intensity) or, alternatively, allows the x-ray dose to be halved without any increase in quantum mottle; however, the theoretical three-fold increase in speed obtained from the greater number of light photons generated per x-ray photon does not help what may be called the x-ray dose to quantum mottle ratio. It is true that this extra speed may be utilized for example, to reduce the sensitivity (i.e., the photographic speed) of the film emulsion, thus allowing utilization of finer "grain" films; however, practically speaking at the present stage of the photographic film art, films having more than sufficient speed and similarly, sufficient "fine grain" characteristics are already available. Thus, in the exemplary embodiment previously described, the fact that the total attenuation of the light by the absorbing material in the overlayer 22 is such that only about 37 percent of the light photons generated reach the film does not actually decrease the useful speed of the screen-film system. In other words, if for each and every x-ray absorption "event" throughout the phosphor layer 14, 40 percent of the light photons generated which travel directly toward the film are absorbed by layer 22 and approximately 87 percent of those photons which follow paths of the type shown at 36, 46, 50 are absorbed by layer 22, this will cause no adverse effect (that is, increase) of the quantum mottle since every x-ray absorbed will be equally represented by the same number of light photons (especially those traveling directly to the film along such paths as at 34).

Although the last statement may seen to be trivial, it should be noted that other, at first glance seemingly equivalent, changes so as to eliminate indirect rays will, in general, adversely affect the quantum mottle. For example, if the surface 52 of the backing 12 adjacent the phosphor layer 14 were made highly absorbent of light photons, it would seem that this would improve the resolution by absorbing those light photons which travel in the "long" direction from their point of origin. However, providing such an absorbing coating will adversely affect the quantum mottle in that on the average, more light photons that were generated within phosphor particles near the backing, such as the exemplary particle number 54, would be absorbed than the light photons emitted from an absorption event in a phosphor particle near the other surface of the layer 14, such as, say, particle 56. Thus, the effect of making surface 52 absorbing is to reduce the effective number of light photons produced by a particle such as 54 relative to those produced by a particle such as 56 even if both were nominally both receiving and absorbing the same number of x-ray photons. Thus, the effect would be at least partially to cancel the x-ray photon absorption events of particle 54 relative to those of particle 56. Thus, in a weighted or statistical sense, the x-ray photon absorptions at particles near the backing are diminished relative to the "average" x-ray photon absorptions, so that the quantum mottle is actually increased by making surface 52 absorbing. This may, perhaps, be best seen by "taking the limit" and assuming that the backing 52 absorbed all of the light photons from x-ray absorptions by particles such as 54 which were near the backing; this would then reduce the total number of effective x-ray absorptions, clearly leading to an increase in the quantum mottle.

Similarly, making the phosphor layer 14 (or more particularly, the binder 18 thereof) somewhat light-absorbing would also have the effect of "weighting" the effectiveness of various x-ray absorption events in an uneven manner. Thus, again, an x-ray absorbed by particle 54 would have the resulting light photons attenuated to a greater extent than would the light photons from a similar x-ray absorption by particle 56. Thus, this also would lead to an increase in the quantum mottle, since for the same number of x-ray absorptions by particle 54 as for particle 56, the film would "see" light photons as if there were less x-ray photon absorptions at particle 54 than at particle 56. Only if the light absorption occurs in such a position, such as in overlayer 22, will the light photons from all phosphor particles be attenuated at least approximately equally; in this manner there is no suppression of the effectiveness of any x-ray absorption event relative to any other in the phosphor layer 14. Therefore, no increase in the quantum mottle occurs.

The light absorption may be effected by incorporating in the overlayer (which typically is an artificial resin) a substance which absorbs part of the radiation emitted by the phosphor. Such a substance may be a dye having its light-absorbing characteristics (i.e., its "color") chosen to absorb in the same wavelength range in which the phosphor emits light. The amount (or more accurately the concentration of dye and the overlayer thickness) are chosen to absorb the desired amount of radiation, such as 40 percent for a ray passing through the overlayer normal to its surfaces, as in the example previously given.

What is claimed is:

1. In a radiographic intensifying screen and photographic film system of the type comprising a phosphor layer for absorbing x-radiation and re-emitting light, an overlayer on the phosphor layer for forming a smooth surface and a photographic film closely adjacent to the overlayer and having appreciable areas spaced therefrom by an air gap, the improvement comprising:
    attenuating means positioned between said phosphor layer and said photographic film for continuously absorbing a portion of said light in substantial proportion to the linear distance said light travels through said attenuating means,
    so that light which is reflected back into said phosphor layer by the surface between said overlayer and said air gap is more highly attenuated relative to light of the same wavelength passing directly through said air gap to said film.
    whereby the intensity of such reflected light, which on further deviation reaches the film at laterally removed locations, is greatly reduced by multiple passages through said attenuating means, thereby suppressing adverse effects on the resolution and contrast of the film image.

2. A radiographic intensifying screen and film system according to claim 1, in which:
    said attenuating means comprises means for substantially uniformly increasing the optical density of said overlayer to cause said overlayer to be light absorbing to a substantial extent.

3. A radiographic intensifying screen and film system according to claim 1, in which:
    said attenuating means comprises a light-absorbing substance substantially uniformly distributed throughout said overlayer.

4. A radiographic intensifying screen and film system according to claim 3, in which:
    said light-absorbing substance comprises a dye absorbing at the wavelengths of said light re-emitted from said phosphor layer.

* * * * *